(12) United States Patent
Bhosale et al.

(10) Patent No.: US 9,139,374 B2
(45) Date of Patent: Sep. 22, 2015

(54) SYSTEM WITH A SUSPENSION DEVICE AND A RAIL

(75) Inventors: Shrikant Bhosale, Katraj (IN); Mahesh Uttekar, Talwade (IN); Deepti Khadke, Chinchwad (IN); Deepak Desai, Viman Nagar (IN); Akhoy Seal, Someshwar Wadi (IN); Sven Müller, Breckerfeld (DE)

(73) Assignee: Terex MHPS GmbH, Duesseldorf (DE)

( * ) Notice: Subject to any disclaimer, the term of this patent is extended or adjusted under 35 U.S.C. 154(b) by 286 days.

(21) Appl. No.: 13/819,214

(22) PCT Filed: Aug. 18, 2011

(86) PCT No.: PCT/EP2011/064242
§ 371 (c)(1),
(2), (4) Date: Feb. 26, 2013

(87) PCT Pub. No.: WO2012/028470
PCT Pub. Date: Mar. 8, 2012

(65) Prior Publication Data
US 2013/0153374 A1   Jun. 20, 2013

(30) Foreign Application Priority Data
Aug. 30, 2010  (DE) .......................... 10 2010 037 229

(51) Int. Cl.
*B65G 41/00* (2006.01)
*B66C 7/04* (2006.01)

(52) U.S. Cl.
CPC .. *B65G 41/00* (2013.01); *B66C 7/04* (2013.01)

(58) Field of Classification Search
CPC .......... F16B 39/04; F16B 39/02; F16B 39/10; F16L 3/14; F16M 11/425; F16M 13/027; E04B 9/18; B66C 7/04; B66C 7/02; B66C 11/16; B66C 11/24; B66C 1/34; B66C 1/42; B61B 3/00; B61B 3/02; B61B 5/00; B61B 5/02
USPC ........... 52/710; 104/89–91, 93; 411/417, 418, 411/315–318
See application file for complete search history.

(56) References Cited

U.S. PATENT DOCUMENTS 1,061,125 A * 5/1913 Reighard ...................... 411/315
1,070,094 A * 8/1913 Young .......................... 411/315

(Continued)

FOREIGN PATENT DOCUMENTS

CA   226988 A    12/1922
DE   29914578 U1 12/1999

(Continued)

OTHER PUBLICATIONS

English translation of International Preliminary Report on Patentability from corresponding International Application PCT/EP2011/064242 issued Mar. 5, 2013.

(Continued)

*Primary Examiner* — Beth Stephan
(74) *Attorney, Agent, or Firm* — Gardner, Linn, Burkhart & Flory, LLP

(57) ABSTRACT

A suspending device for a rail, in particular a rail of an overhead conveyor or lifting gear, with a tensile element, which comprises a threaded rod and at least one connecting part that is screwed to the latter, and with a securing element, which secures the screw connection between the threaded rod and the connecting part against loosening. The suspending device for a rail, in particular a running rail of a suspended conveyor or lifting gear, allows simplified and secure mounting in that the securing element engages in a groove with a pin part in the assembled state, with the groove being disposed in the threaded rod.

12 Claims, 6 Drawing Sheets

(56) References Cited

U.S. PATENT DOCUMENTS

| | | | | |
|---|---|---|---|---|
| 1,159,618 | A | * | 11/1915 | Talley ............... 411/315 |
| 1,204,548 | A | * | 11/1916 | Dixon ............... 411/315 |
| 1,236,838 | A | * | 8/1917 | Harris ............... 411/316 |
| 1,438,312 | A | * | 12/1922 | Kerwin ............... 411/315 |
| 1,457,736 | A | * | 6/1923 | Johnson ............... 411/315 |
| 2,308,605 | A | * | 1/1943 | Hillstrom ............... 411/210 |
| 2,395,234 | A | | 2/1946 | Schlueter |
| 3,095,174 | A | | 6/1963 | Dehn et al. |
| 5,120,170 | A | * | 6/1992 | Kalies ............... 411/213 |
| 5,685,681 | A | * | 11/1997 | Smith, II ............... 411/395 |
| 6,135,693 | A | * | 10/2000 | Leitzke et al. ............... 411/530 |
| 7,503,263 | B2 | * | 3/2009 | Birkigt et al. ............... 104/111 |

FOREIGN PATENT DOCUMENTS

| | | |
|---|---|---|
| DE | 10131183 A1 | 1/2003 |
| DE | 102005040421 A1 | 7/2007 |
| DE | 102008012293 A1 | 9/2009 |
| EP | 1129979 A1 | 3/2000 |
| JP | 49-4899 B | 2/1974 |
| KR | 20090062281 A | 6/2009 |

OTHER PUBLICATIONS

International Search Report and Written opinion mailed Oct. 25, 2011 in corresponding International Application PCT/EP2011/064242.

* cited by examiner

SYSTEM WITH A SUSPENSION DEVICE AND A RAIL

CROSS REFERENCE TO RELATED APPLICATION

The present application claims the priority benefits of International Patent Application No. PCT/EP2011/064242, filed on Aug. 18, 2011, and also of German Patent Application No. DE 10 2010 037 229.3, filed on Aug. 30, 2010, which are hereby incorporated herein by reference in their entireties.

BACKGROUND OF THE INVENTION

The invention relates to a suspension device for a rail, in particular a rail of an overhead conveyor or a lifting gear, having a tensile element which includes a threaded rod and at least one connection part screwed thereto, and having a securing element which prevents the screw connection between the threaded rod and the connection part from being loosened.

A suspension for a crane rail on a supporting mechanism in the form of a cover or a cover profile is known from German patent document DE 10 2005 040 421 B4. A crane can travel along the crane rail via travelling mechanisms. The crane rail is attached to the supporting mechanism via several suspensions spaced apart from each other in the longitudinal direction of the crane rail. Each of the suspensions consists essentially of an upper attachment part having a first threaded sleeve, a threaded rod and a lower attachment part having a second threaded sleeve. The upper attachment part is attached to the supporting mechanism and the lower attachment part is attached to the rail to be suspended. The lower attachment part is suspended on the upper attachment part via the threaded rod whose opposite ends are screwed into the first threaded sleeve and second threaded sleeve. By using a threaded rod in conjunction with the threaded sleeves, the vertical length of the complete suspension can easily be adapted to the local conditions in order to thus suspend the crane rail in the desired orientation and to distribute the load on the suspensions. In order to protect the connection between the threaded rod and the lower attachment part and the upper attachment part against unscrewing, a spring connector is provided in each case and comprises a pin part and a spring part. For this purpose, the pin part is inserted through a through-going elongate mounting hole in the respective threaded sleeve and a through-going elongate mounting hole in the threaded rod, whilst the spring part lies against the respective threaded sleeve on the outside. The pin part is thus prevented from sliding out of the elongate mounting holes. These suspensions are also configured to swing since this ensures that the crane rails are oriented automatically or come into the condition of equilibrium, i.e., there is no substantial bending load in the tensile element. The swinging suspension is effected via ball-and-socket joint bearings.

So-called turnbuckles are known from the German utility model DE 299 14 578 U1 and from the German laid-open document DE 101 31 183 A1 and are also used for the suspension of rails of overhead monorails in the mining industry. These turnbuckles consist essentially of a central turnbuckle sleeve and two tensioning eyelets laterally connected thereto. The tensioning eyelets each consist of an eyelet to accommodate hooks, bolts or cables, and a shaft, disposed on the eyelet, having an outer thread. The turnbuckle sleeve is formed either as an elongate frame or as a sleeve, on the opposite ends of which are disposed inner threads in the form of nuts. The shafts of the tensioning eyelets are screwed into these nuts. The outer thread of the shafts run in opposite directions which means that the eyelets of the tensioning eyelets can be moved towards each other or away from each other by rotating the turnbuckle sleeve relative to the two tensioning eyelets. In the case of one of the two turnbuckles, provision is also made that the two tensioning eyelets can be blocked with respect to the turnbuckle sleeve. For this purpose, several grooves are disposed in the shafts which extend in each case in the longitudinal direction of the shafts. Mounted on the tensioning eyelets is in each case a resiliently biased pin which can be moved from a pulled-back rest position into a blocking position to block the turnbuckle, the pin protruding into one of the grooves in this blocking position. Such turnbuckles are fundamentally different from the design of the previously described suspension devices since these do not comprise a central threaded rod but rather only two tensioning eyelets having threaded shafts.

SUMMARY OF THE INVENTION

The present invention provides a suspension device for a rail, in particular a running rail of an overhead conveyor or a lifting gear, which allows simplified and secure assembly.

In accordance with an embodiment of the invention, in the case of a suspension device for a rail, in particular a rail of an overhead conveyor or a lifting gear, having a tensile element which includes a threaded rod and at least one connection part screwed thereto, and having a securing element which prevents the screw connection between the threaded rod and the connection part from being loosened, simplified and secure assembly is achieved by virtue of the fact that the securing element engages with a pin part into a groove in the assembled state, said groove being disposed in the threaded rod. The groove in the threaded rod results in considerably simpler assembly since the securing element can be easily inserted after the groove has been aligned flush with the opening, without a bore in the threaded rod and/or the connection part having to be provided. There is no need for any length-dependent mechanical working during assembly. The groove results only in a small reduction in cross-section in the threaded rod and barely reduces its strength.

In terms of the invention, a threaded rod is understood to mean a bar having an outer thread which has no specially shaped surfaces or regions for engaging a tool, such as for example a hexagonal head. The outer thread is provided at least in the region of the opposite ends of the threaded rod but typically extends over the entire length of the threaded rod. The outer thread also has just one pitch direction. Since the threaded rod is simply designed in this manner, it is particularly suitable for use in the suspension device since the length of the threaded rod to be used can frequently only be determined on site when suspending the rails. A threaded rod can then be simply shortened to the required length on site. The threaded rods can thus be produced in an advantageous manner in graded standard lengths. An appropriate simple length adjustment can not be effected in the case of turnbuckles since the lengths of the shafts of the tensioning eyelets are adapted to the length of the turnbuckle sleeve.

The securing element acts and is supported in a reliable manner by virtue of the fact that the securing element engages into the groove with the pin part through an opening in the connection part in the assembled state.

From a manufacturing point of view, it has proven to be convenient for the groove to extend in the longitudinal direction of the threaded rod.

Shortening the threaded rods and also procuring the threaded rods is facilitated by virtue of the fact that the groove extends in the longitudinal direction of the complete threaded rod.

In a particular embodiment, provision is made that the securing element is formed in the manner of a two-spring connector having two opposing limbs. In this case, the pin part is shortened compared with a commercially available two-spring connector, since it only has to be inserted into the groove in the assembled state. The securing element is thus formed in a manner allowing it to be produced simply and the sleeve-shaped connection parts only need to be provided with the bores for use of the two-spring connector and do not have to be subjected to any additional, costly, mechanical working.

The pin part is secured in the groove via the limbs of the two-spring connector which, in the assembled state of the securing element, engage behind the sleeve-shaped connection part, as seen in the direction of the pin part.

In a particular manner, provision is made that the opening is formed as an elongate hole, whose longitudinal extension is oriented in the longitudinal direction of the threaded rod, and the pin part is formed in a u-shaped manner such that a plane spanned by the pin limbs is oriented at right angles to a plane spanned by the limbs of the securing element and includes the longitudinal axis of the threaded rod. In other words, the pin part is formed in a u-shaped manner as seen transversely with respect to its insertion direction and as seen transversely with respect to the longitudinal direction of the threaded rod. The securing element, in particular its pin part, is hereby prevented from being able to rotate in the opening and in the groove. Therefore, the limbs also do not slide down from the threaded sleeve portion even when there is a mechanical influence from the outside.

In a particular embodiment, provision is made that the tensile element includes, in addition to the threaded rod, a lower connection part and an upper connection part.

In a typical usage mode, in the assembled state the rail is suspended on the lower connection part and the upper connection part is attached to a supporting element.

Further features, details and advantages of the invention are provided in the subordinate claims and the following description of exemplified embodiments shown in the drawings.

DESCRIPTION OF THE PREFERRED EMBODIMENTS

Figure 1:
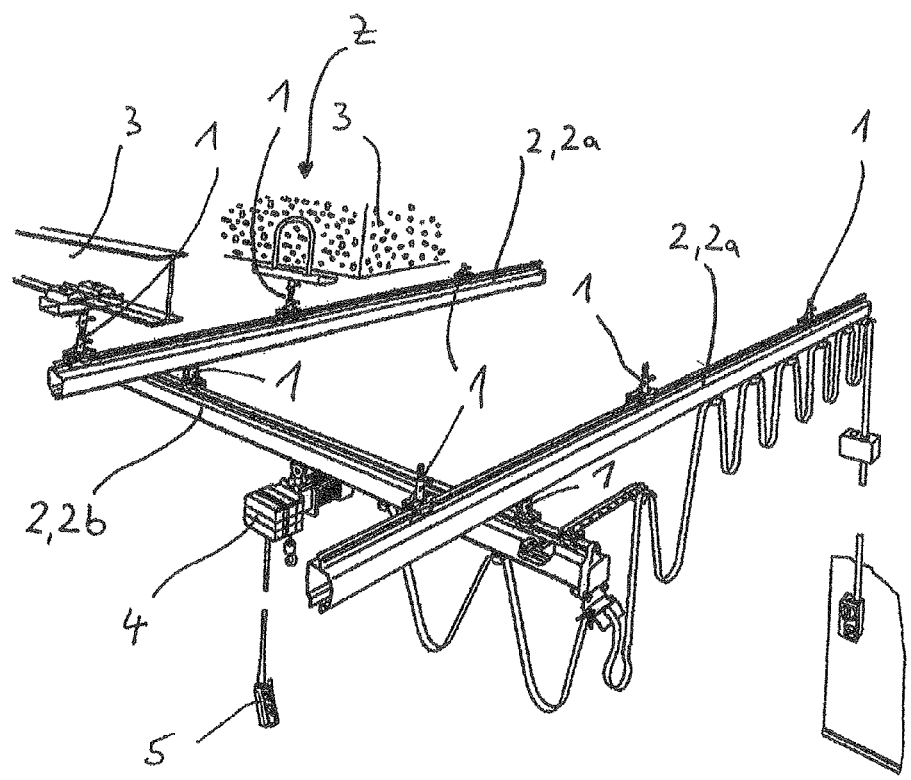
FIG. 1 shows a perspective view of a single girder suspension crane.

FIG. 1 shows a plurality of suspension devices 1 in conjunction with a single girder suspension crane. By means of the suspension devices 1, rails 2, which extend substantially horizontally and are profiled in a downwardly open c-shape, are suspended on supporting elements 3 or further rails 2. The supporting elements 3 are formed as I-beams. Since the present exemplified embodiment relates to a single girder suspension crane, two first rails 2a, which extend in a substantially horizontal manner in parallel with and at a spaced disposition with respect to each other, are provided and are used as running rails of the single girder suspension crane, and a second rail 2b, which forms a crane rail, which is oriented substantially transversely with respect to the first rails 2a and can travel along the first rails 2a. For this purpose, the second rail 2b is suspended via two suspension devices 1 in each case on a travelling mechanism which is not shown and can travel along the first rails 2a. A lifting gear 4 such as a chain or cable hoist is generally suspended on the second rail 2b and can travel along the second rail 2b by means of a further travelling mechanism, not shown. The lifting gear 4 can be controlled by a pendant switch 5 suspended on the lifting gear 4.

Figure 2:
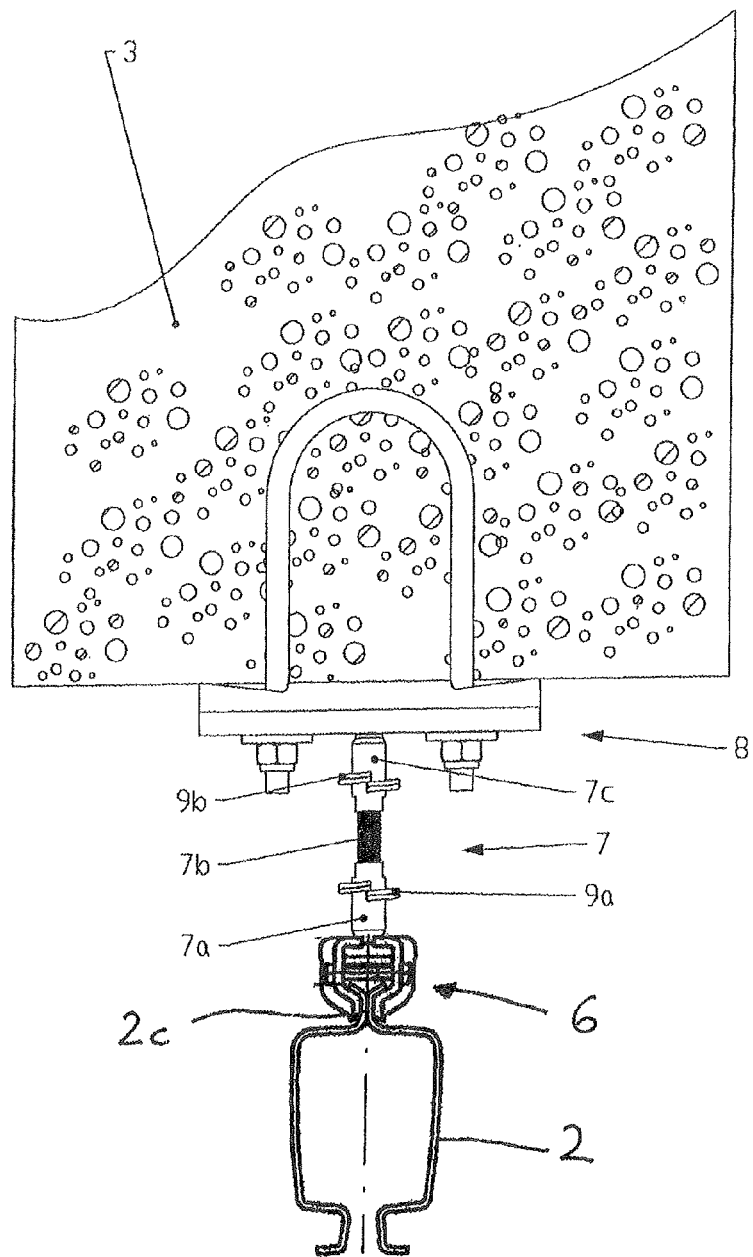
FIG. 2 shows an enlarged portion of the region Z of FIG. 1.

FIG. 2 shows an enlarged portion of the region Z of FIG. 1 which relates to a suspension device 1. The suspension device 1 consists essentially of a lower attachment part 6, a tensile element 7 and an upper attachment part 8. The rail 2a is suspended on the tensile element 7 of the suspension device 1 by means of the lower attachment part 6. The tensile element 7 is attached to the supporting element 3, which is formed in this case as a concrete slab, via the upper attachment part 8. In order to be able to provide the rail, which is C-shaped and open at the bottom, with suspension devices 1 at any location in its longitudinal direction, it comprises in the upper region an upwardly protruding web 2c extending in the longitudinal direction of the rail 2a, which web extends away from the rail 2a and thus upwards in a v-shaped manner. The lower attachment part 6 is formed in a clamp-like manner and engages around the upwardly widening web 2c. The tensile element 7 is attached to the upper end of the lower attachment part 6 opposite the web 2c. Depending upon the local conditions and the manner of using the rail 2a, this attachment can be formed in a rigid or swinging manner. A rigid connection can be effected for example via a corresponding screw connection; a swinging connection can be provided via a ball coupling in the region of the end of the tensile element 7 and a corresponding receptacle in the region of the lower attachment part 6.

The rod-shaped tensile element 7 includes a lower connection part 7a, a threaded rod 7b and an upper connection part 7c. The lower and upper connection parts 7a, 7c are formed substantially as threaded sleeves 7d at their end facing the threaded rod 7b and are provided at their opposite ends for example with an outer thread in the case of a rigid attachment or with a half-ball coupling part 7e (see FIG. 3) for the articulated connection to the lower attachment part 6 or upper attachment part 8. Designing the tensile element 7 with a threaded rod 7b is advantageous in that depending upon the local conditions the threaded rods 7b can be shortened to the desired suspension length and then assembled into the required length by screwing the lower connection part 7a and the upper connection part 7c to the tensile element 7. In order to secure the screw connection between the lower connection part 7a and the threaded rod 7b as well as the upper connection part 7c and the threaded rod 7b, an upper securing element 9b and a lower securing element 9a are provided. The lower and upper securing elements 9a, 9b are formed in each case in the manner of a two-spring connector.

Figure 3:
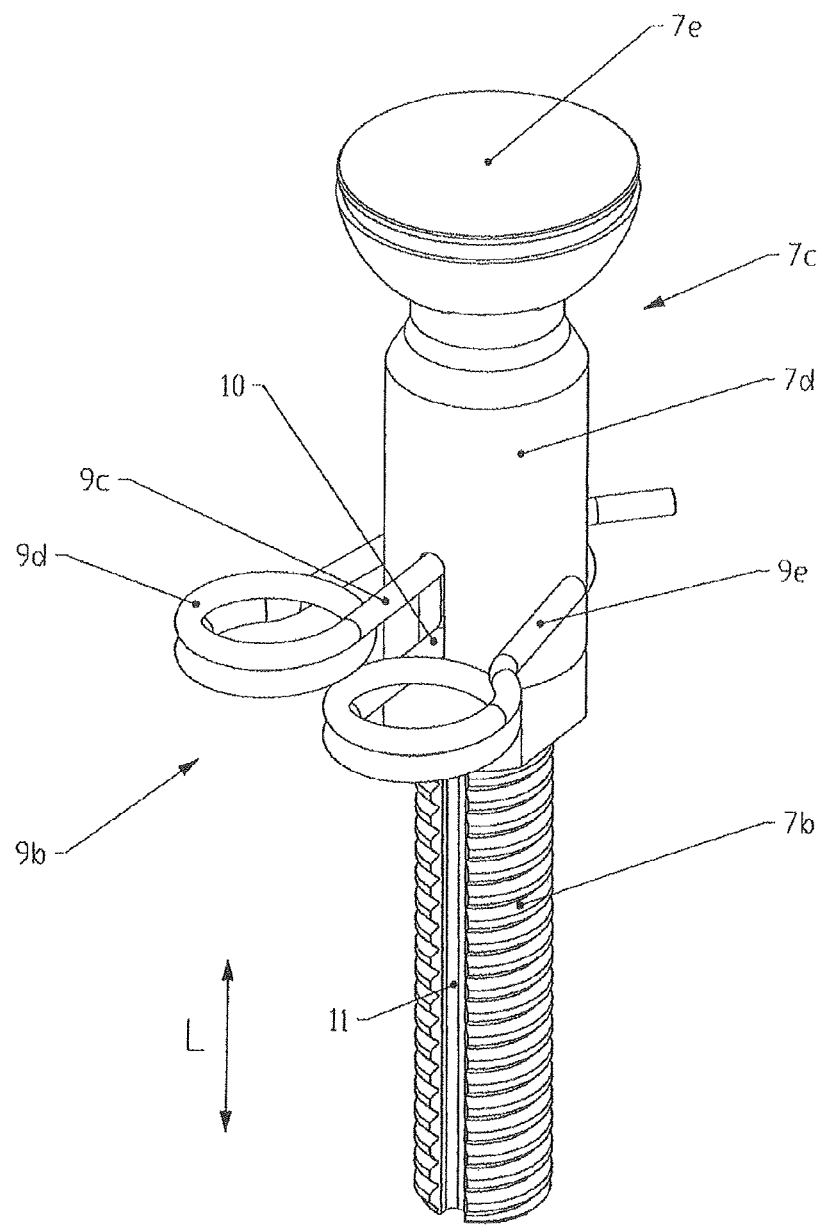
FIG. 3 shows an enlarged portion of FIG. 2, taken from the region of a securing element in the manner of a two-spring connector.

FIG. 3 shows an enlarged view of an upper connection part 7c which is engaged with a threaded rod 7b and is secured via an upper securing element 9b. The upper connection part 7c is divided into a lower threaded sleeve portion 7d and an upper half-ball coupling part 7e. The half-ball coupling part 7e and the threaded sleeve portion 7d are formed in one piece and the curved surface of the half-ball coupling part 7e faces the threaded sleeve portion 7d. The half-ball coupling part 7e is part of a ball-and-socket joint bearing whose complementarily formed reception shell is disposed in the upper attachment part 8 of the suspension device 1. The threaded sleeve portion 7d is provided with an inner thread, into which the upper end of the threaded rod 7b is screwed with its outer thread. In order to secure the threaded rod 7b in the threaded sleeve portion 7d, the wall of the threaded sleeve portion 7d is provided with an opening 10, into which a pin part 9c of the upper securing element 9b can be inserted. The opening 10 passes through the wall of the threaded sleeve 7d which means that the pin part 9c of the upper securing element 9b impinges upon the outer periphery of the threaded rod 7b. Furthermore, the threaded rod 7b comprises a groove 11 extending in its longitudinal direction L, wherein the pin part 9c of the upper securing element can be inserted into this groove. The threaded rod 7b and the upper connection part 7c are hereby effectively prevented from rotating with respect to each other.

It can also be seen that, in a configuration typical for a two-spring connector, the pin part 9c becomes two helical regions 9d disposed in a symmetrical manner with respect to each other, and is formed in this case to increase the spring force as a double coil having two windings. Each of the two helical regions 9d becomes a limb 9e, as seen starting from the pin part 9c, which limb abuts against the peripheral surface the cylinder-shaped threaded sleeve portion 7d from the outside when the upper securing element 9b is in the assembled state. As seen from the helical region 9d, each of the limbs 9e becomes a curved region 9f, wherein the curved region 9f follows the peripheral surface of the threaded sleeve portion 7d and then curves inwards. Since the curved region 9f lies against the peripheral surface of the threaded sleeve portion 7d in the region of approximately one eighth of the periphery of the threaded sleeve portion 7d and, as seen from the direction of the pin part 9e, resiliently engages behind the threaded sleeve portion 7d and the two curved regions 9f form a counter-bearing for the pin part 9c inserted in its longitudinal direction into the opening 10 and groove 11 and thus in the radial direction of the threaded rod 7b. The longitudinal extensions of the pin part 9c and the limb 9e extend substantially in parallel with and at a spaced disposition with respect to each other. It can also be seen from FIG. 3 that the pin part 9c is formed as a whole in a U-shaped manner since there follows two helical regions 9d each in the manner of a two-spring connector.

The above description also applies to the identically formed lower connection part 7a and the associated lower securing element 9a.

Figure 4:
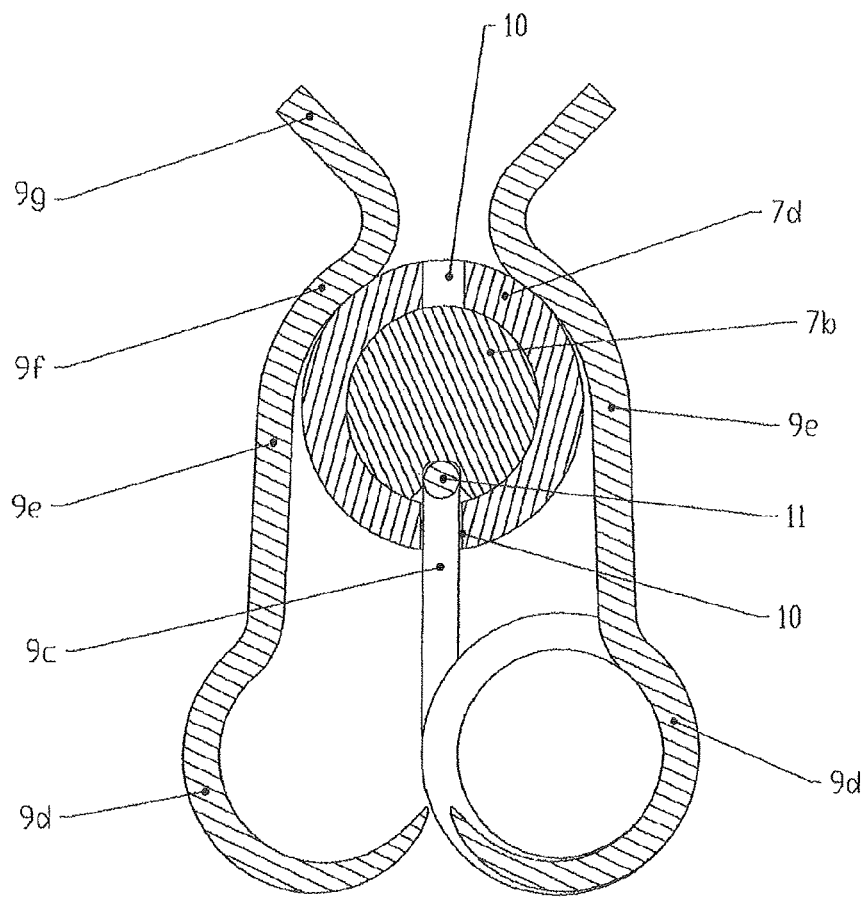
FIG. 4 shows a sectional view of FIG. 3.

FIG. 4 illustrates a sectional view of FIG. 3, taken from the region of the threaded sleeve 7d with a threaded rod 7b also screwed-in. It can be seen that the pin part 9c protrudes through the opening 10 in the threaded sleeve portion 7d into the groove 11 in the threaded rod 7b. Only a single groove 11 is provided in the threaded rod 7b. It would also be fundamentally possible to provide several grooves in order to achieve a more precise adjustment of the length of the tensile element 7. However, practice has shown that one groove 11 is sufficient since length adjustments of the tensile element 7 in the millimeter range are already possible using this one groove. FIG. 4 also shows that the limb 9e of the upper securing element 9b in a curved region 9f follows the contour of the peripheral surface of the threaded sleeve portion 7d. This curved region 9f is then followed by an approximately 90° bend outwards which issues into an opening region 9g. By way of these two opening regions 9g, extending in opposite directions, it is easier to fit the securing element onto the threaded sleeve portion 7d against the spring force of the helical regions 9d.

The securing element 9 is also dimensioned such that it can be fitted onto the threaded sleeve portion 7d laterally and in this case the pin part 9c then already protrudes into the opening 10 but not yet into the groove 11, since this is not yet aligned with the opening 10. Upon rotation of the threaded rod 7b relative to the threaded sleeve portion 7d, the result—when the groove 11 is aligned with the opening 10—is that the pin part 9c slides automatically into the groove 11 by reason of the spring force of the securing element 9. This is a great advantage during assembly and reduces the assembly time.

Figure 5:
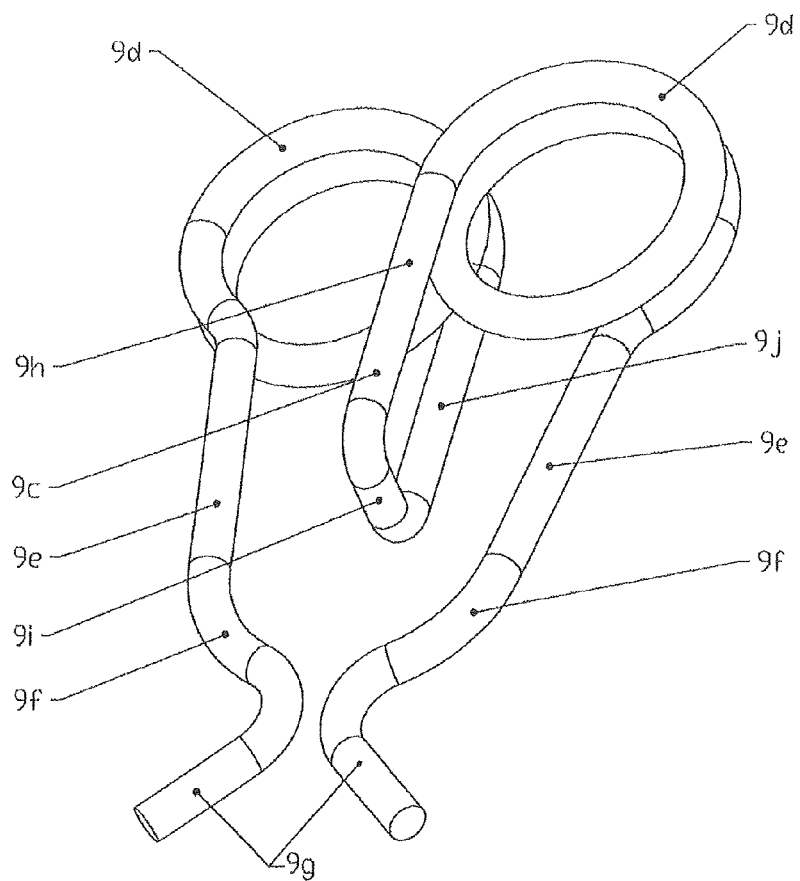
FIG. 5 shows a perspective view of the securing element of FIG. 3.

FIG. 5 shows a perspective view of a lower or upper securing element 9a, 9b. The u-shaped formation of the pin part 9c can be seen particularly clearly in this view. In a corresponding manner, the opening 10 in the threaded sleeve 7d is not formed as a circular bore but rather as an elongate hole. The u-shaped region of the pin part 9c thus comprises a web part 9i, which in the assembled state rests in the base of the groove 11, and respectively opposing lower and upper web limbs 9h and 9j adjoining thereto and extending in a substantially mutually parallel manner.

It is also fundamentally possible for the opening 10 to adjoin the edge facing the threaded rod 7b and thus to have only the form of a recess open in the direction of the threaded rod 7b.

Figure 6:
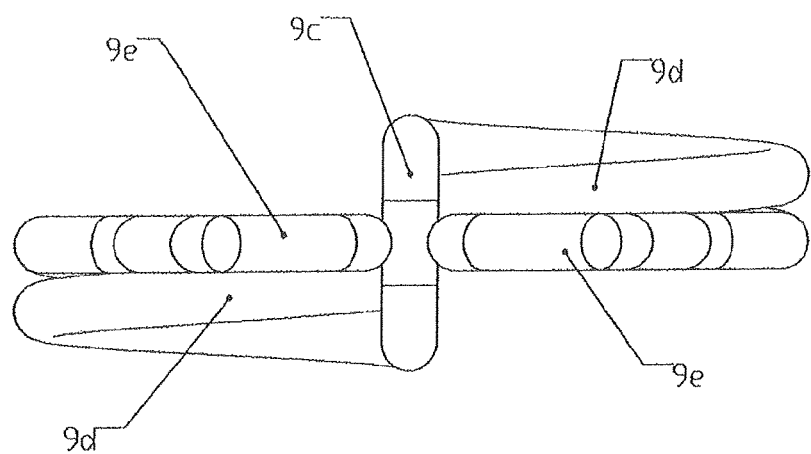
FIG. 6 shows a front view of the securing element of FIG. 5.

FIG. 6 shows a view from FIG. 5 in the direction of the free end of the pin part 9c. It can be seen in particular that the doubled helical regions 9d are to be wound starting from the U-shaped pin part 9c from the top or bottom inwardly and towards each other so that despite the doubled helical regions 9d, the limbs 9e which are oppositely arranged in relation to the threaded sleeve portion 7d, lie in a plane and thus the pin part 9e is securely held in the opening 10 and groove 11. It can also be seen that the pin part 9c is formed to be shorter than a commercially available two-spring connector since it is inserted only into a groove 11 and does not have to be inserted through the through-going bore—otherwise typically provided—in the threaded rod.

In this exemplified embodiment, the suspension device 1 is described in conjunction with a single girder suspension crane. Of course, this new suspension device 1 is also suitable for suspending rails 2, 2a, 2b of double girder suspension cranes and monorails as well as rails 2, 2a, 2b on which travelling mechanisms of overhead conveyors or lifting gears can travel. The securing element is also described as a two-spring connector. It is by all means possible also to form this as a single spring connector. Typically, the threaded rod 7b has an outer thread over its entire length. It is also feasible for the threaded rod 7b to have an outer thread only at its opposite end regions. Of course, it is also feasible to provide, in addition to the single groove 11, a second groove 11 opposite thereto. Third and fourth grooves distributed evenly over the periphery are also feasible. Increasing the number of grooves 11 means that the effective length of the threaded rod 7b can be adjusted in a more precise manner.

LIST OF REFERENCE NUMERALS

1 Suspension device
2 Rail
2a First rails
2b Second rails
2c Web
3 Supporting element 4 Lifting gear
5 Pendant switch
6 Lower attachment part
7 Tensile element
7a Lower connection part
7b Threaded rod
7c Upper connection part
7d Threaded sleeve portion
7e Half-ball coupling part
8 Upper attachment part
9a Lower securing element
9b Upper securing element
9c Pin part
9d Helical region
9e Limb
9f Curved region
9g Opening region
9h Lower pin limb
9i Pin web
9h Upper pin limb
10 Opening
11 Groove
L Longitudinal direction
Z Enlargement region

The invention claimed is:

1. System with a suspension device and with a rail, wherein the suspension device suspends the rail from a supporting element, said suspension device having a tensile element which includes a threaded rod and at least one connection part screwed thereto, and having a securing element which prevents the screw connection between the threaded rod and the connection part from being loosened, wherein the tensile element comprises, in addition to the threaded rod, the at least one connection part comprising a lower connection part and an upper connection part and in the assembled state the rail is suspended on the lower connection part and the upper connection part is attached to the supporting element, wherein the securing element engages with a pin part into a groove in an assembled state, said groove being disposed in the threaded rod and the groove extends in a longitudinal direction of the threaded rod.

2. The system as claimed in claim 1, wherein the securing element engages into the groove with the pin part through an opening in one of the connections parts in the assembled state.

3. The system as claimed in claim 2, wherein the threaded rod has a length and the groove extends in the longitudinal direction along the length of the threaded rod.

4. The system as claimed in claim 1, wherein the securing element is formed in the manner of comprises a two-spring connector having two opposing limbs.

5. The system as claimed in claim 4, wherein one of the connections parts is sleeve-shaped and the limbs engage the sleeve-shaped connection part opposite to the pin part as seen in the direction of the pin part.

6. The system as claimed in claim 1, wherein an opening is formed as an elongate hole, the hole having a longitudinal extension oriented in the longitudinal direction of the threaded rod, and the pin part is formed in a u-shaped manner as seen transversely with respect to its insertion orientation when in the assembled state and with respect to the longitudinal direction of the threaded rod.

7. The system as claimed in claim 1, wherein the threaded rod has a length and the groove extends in the longitudinal direction along the length of the threaded rod.

8. The system as claimed in claim 2, wherein the securing element is a two-spring connector having two opposing limbs.

9. The system as claimed in claim 8, wherein, the one of the connection parts is sleeve-shaped and the limbs engage the sleeve-shaped connection part opposite to the pin part as seen in the direction of the pin part.

10. The system as claimed in claim 3, wherein the securing element is a two-spring connector having two opposing limbs.

11. The system as claimed in claim 10, wherein, the one of the connection parts is sleeve-shaped and the limbs engage behind the sleeve-shaped connection part opposite to the pin part as seen in the direction of the pin part.

12. The system as claimed in claim 11, wherein the opening is formed as an elongate hole, whose longitudinal extension is oriented in the longitudinal direction of the threaded rod, and the pin part is formed in a u-shaped manner transversely with respect to its insertion direction orientation when in the assembled state and with respect to the longitudinal direction of the threaded rod.

* * * * *